Jan. 3, 1928.
W. S. PRITCHARD
WINDSHIELD
Filed Aug. 23, 1926
1,655,337
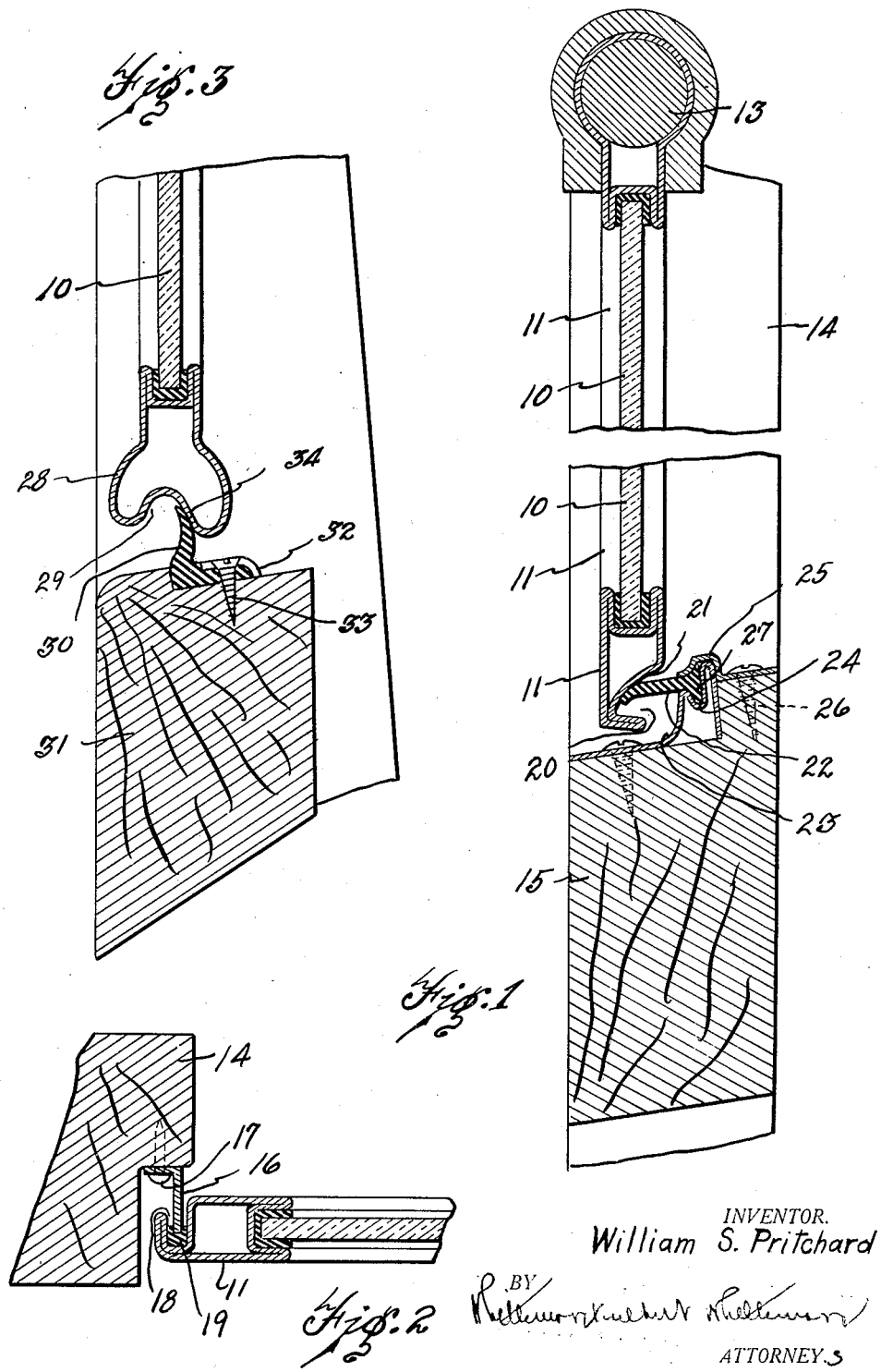
INVENTOR.
William S. Pritchard
BY
ATTORNEYS Patented Jan. 3, 1928.

1,655,337

UNITED STATES PATENT OFFICE.

WILLIAM S. PRITCHARD, OF DETROIT, MICHIGAN, ASSIGNOR TO MOTOR PRODUCTS CORPORATION, OF DETROIT, MICHIGAN, A CORPORATION OF NEW YORK.

WINDSHIELD.

Application filed August 23, 1926. Serial No. 131,007.

This invention relates to windshields and more especially to weather-proofing means for windshields, particularly those of the swinging type.

It is essential, in the swinging type of windshields, wherein the shield swings from a substantially vertical position or a position coincident with the frame to a position in outward or inward angular relation with the same, that means be provided for positively weather-proofing the space between the frame and shield at the sides thereof and also that means be provided for weather-proofing the space between the lower edge of the windshield and the base of the frame. It is also essential to the efficiency and commercial acceptability of devices of this character that adequate provision be made for the disalignment or warping of the windshield sash whereby even under such conditions the windshield may be thoroughly weather-proofed throughout its periphery.

It is therefore an object of this invention to provide weather-proofing means for windshields in which the above mentioned advantages in operation are attainable and to provide a construction involving these characteristics which is simple and economical to manufacture, durable, and one which may be assembled with facility.

The several objects, advantages and novel details of construction of two illustrative examples of the invention will be made more apparent as this description proceeds especially when considered in connection with the accompanying drawing wherein Figure 1 is a vertical sectional view through a windshield constructed in accordance with this invention.

Figure 2 is a sectional view taken substantially on the plane indicated by line 2—2 in Figure 1, and Figure 3 is a fragmentary vertical sectional view through a modified form of construction.

Referring now particularly to the drawings wherein like reference characters indicate like parts it will be noted that there is illustrated a windshield 10 including a sash 11 pivotally supported adjacent its upper end as indicated at 13 so as to be capable of a swinging movement. Inasmuch as the operating mechanism for the windshield forms no part of the present invention the same is not illustrated or described.

The windshield is mounted upon a frame including side frame members 14 and a base 15 and for weather-proofing the shield at the vertical sides thereof I provide each of the frame members 14 with a weather strip 16 of substantial L-shape in cross section secured in a rabbeted portion thereof by means of securing members 17. The sash 11 is provided with a cooperating recess or pocket 18 in which a strip or pad of resilient material 19 is arranged the latter being engaged by the edge of the weather strip 16 in the closed position of the windshield.

The sash 11 at the bottom of the windshield is formed with a recess or pocket 20 provided with an inclined wall 21 arranged for cooperation with a weather strip 22 of flexible material mounted upon the base frame 15. In the illustrative embodiment of the invention shown herein the strip 22 is shown as supported in position by means of a plate or strip 23 arranged in a rabbet formed in the upper sides of the base 15 this strip being provided with a longitudinally extending groove or recess 24. A retaining strip 25 secured to the base 15 as for instance by means of screws 26 cooperates with the recess 24 to engage the enlarged base 27 of the weather strip 22. Thus the strip 22 is mounted in a substantially horizontal position both longitudinally and transversely and extends in a direction opposed to the movement of the windshield in closing and also opposed to the recess or pocket 20 formed in the sash thereof.

As will be apparent the wall 21 of the recess is inclined upwardly and inwardly with reference to the interior of the vehicle and when the windshield is moved to closed position and the weather strip and recess brought into engagement this inclined wall deflects the free edge of the weather strip downwardly thus effecting a surface contact between the wall of the recess and the weather strip. When the weather strip has been deflected as illustrated in Figure 1 of the drawings it closes the space between the overlapping portions of the base 15 and sash 11 and is so arranged that the entrance of the outer elements, such as rain, snow, wind and the like tend to force this weather strip against the wall 21 and to thus effect a more intimate engagement between these parts to prevent the entrance into the interior of the vehicle of the said outer elements. It will also be obvious that the weather-proofing engagement between the weather strip and recess will be effected before the windshield is fully closed to thus compensate for any disalignment of the windshield or between the windshield and frame resulting from the windshield or frame being warped or sprung. Under such conditions an engagement between the weather strip and recess might be effected at one side of the windshield before the other but by reason of the sliding contact between the parts an engagement throughout the length of the weather strip will be obtained upon the further movement of the windshield in the closing direction.

In Figure 3 a slightly modified form of construction is shown wherein the sash 28 is formed in the bottom edge thereof with a pocket or recess 29 cooperating with a weather strip 30 of flexible material secured in a rabbet formed in the upper face of the base 31 by means of a retaining strip 32 and fastening means 33. This weather strip constitutes in effect a fence, it being understood that with this construction the windshield 10 is movable either inwardly or outwardly with reference to the frame. The weather strip has a surface contact with the wall 34 of the recess and, as in the previously described construction, the entrance of the outer elements tends to force the weather strip more securely against this wall of the recess. Likewise a sliding contact is afforded between the parts so that the space between the windshield and frame will be thoroughly weather proofed even in the event the windshield and frame are relatively disaligned.

While two forms of the invention have been described and illustrated herein somewhat in detail it will be readily apparent that various changes in many of the essential and all of the non-essential details of the invention may be resorted to without departing from the spirit and scope thereof and to this end reservation is made to make such changes as may come within the purview of the accompanying claims.

What I claim as my invention is:

1. In a windshield construction, a swinging sash, a frame, a recess formed in said sash at the swinging side thereof, and a flexible weather strip secured to said frame and projecting in a direction opposed to the closing movement of said sash and engageable in said recess when the windshield is closed.

2. In a windshield construction, a swinging sash, a frame, a recess formed in said sash at the swinging side thereof, and a flexible weather strip secured to said frame and projecting in a direction opposed to the closing movement of said sash and flexed into surface contact with said recess when the windshield is closed.

3. In combination, a swinging windshield sash, a frame, a recess in the swinging side of said sash, and a flexible weather strip mounted on said frame in opposed relation to said recess and engageable therein when the windshield is closed.

4. In combination, a swinging windshield sash, a frame, a recess in the swinging side of said sash provided with an inclined wall and a flexible weather strip mounted on said frame in opposed relation to said recess and deflected into intimate contact therewith by said inclined wall, when the windshield is closed.

5. In combination, a swinging windshield sash, a frame, a flexible weather strip mounted on said frame, an opposed recess formed in a side of said sash, a wall of said recess being shaped to deflect said weather strip in the direction of the opening between said sash and frame when the windshield is closed.

6. In combination, a swinging windshield sash, a frame, a flexible weather strip substantially horizontally mounted on said frame, an opposed recess formed in the lower swinging side of said sash, a wall of said recess being shaped to deflect said weather strip in the direction of the opening between said sash and frame when the windshield is closed.

7. In a windshield construction, a frame, a swinging windshield sash overlapping said frame, a recess formed in said sash and provided with an inclined wall, a flexible weather strip mounted on said frame on opposed relation to said recess and deflected by engagement with said wall in the direction of the opening between said parts when the windshield is closed.

8. In a windshield construction, a frame, a swinging windshield sash, a weather strip carried by one of said members, a recess formed in the other of said members and a resilient pad in said recess engageable by said weather strip.

9. In combination, a swinging windshield sash, a frame, a pocket formed in one face of the lower side of said sash, with a portion of the wall thereof inclined, a flexible weather strip mounted on said frame and projecting toward said recess whereby when said windshield is closed said weather strip will be deflected downwardly into a position wherein the entrance of the outer elements tends to produce a more intimate engagement between the parts.

10. In combination, a swinging windshield sash, a frame, a pocket formed in one face of the lower side of said sash, a plate extending across the lower end of said frame having a longitudinally extending recess, a flexible weather strip having an enlarged end portion positioned within said recess and a horizontally disposed portion projecting toward said pocket and engageable therein when the windshield is swung to closed position, and a retainer plate secured to said frame having a portion cooperating with said recess to hold said weather strip in place.

11. In combination, a swinging windshield sash, a frame, a flexible weather strip extending outwardly from said frame, an opposed recess formed in the inner side of said sash having an inwardly extending inclined wall engageable with the weather strip when the windshield is closed to deflect the outer edge of the strip downwardly into a more intimate contact with the sash.

In testimony whereof I affix my signature.

WILLIAM S. PRITCHARD.